(12) United States Patent
Nichols et al.

(10) Patent No.: US 7,310,138 B2
(45) Date of Patent: Dec. 18, 2007

(54) METHOD FOR AUGMENTING RADIO POSITIONING SYSTEM USING SINGLE FAN LASER

(75) Inventors: Mark E. Nichols, Christchurch (NZ); Nicholas C. Talbot, Ashburton (AU); Gary L. Cain, Springfield, OH (US)

(73) Assignee: Trimble Navigation, Ltd, Sunnyvale, CA (US)

( * ) Notice: Subject to any disclaimer, the term of this patent is extended or adjusted under 35 U.S.C. 154(b) by 162 days.

(21) Appl. No.: 11/214,221

(22) Filed: Aug. 27, 2005

(65) Prior Publication Data

US 2007/0058161 A1    Mar. 15, 2007

(51) Int. Cl.
*G01B 11/26*    (2006.01)
(52) U.S. Cl. .................................. 356/139.01
(58) Field of Classification Search ............ 356/139.01
See application file for complete search history.

(56) References Cited

U.S. PATENT DOCUMENTS

2003/0137652 A1* 7/2003 Mori ......................... 356/73.1
2003/0174305 A1 9/2003 Kasper et al.
2006/0127096 A1* 6/2006 Nichols ....................... 398/115

FOREIGN PATENT DOCUMENTS

EP    1 195 615 B1   12/2004
EP    1 524 497 A1    4/2005

* cited by examiner

*Primary Examiner*—Thomas H. Tarcza
*Assistant Examiner*—Luke D. Ratcliffe
(74) *Attorney, Agent, or Firm*—Boris G. Tankhilevich

(57) ABSTRACT

A method of augmenting a mobile radio positioning system (Mobile_RADPS) by using a stationary fan laser transmitter. A rover comprises the mobile radio positioning system (Mobile_RADPS) integrated with a mobile laser detector. The stationary fan laser transmitter is integrated with a stationary radio positioning system (Stationary_RADPS). The method comprises the following steps: (A) generating a single sloping fan beam by the stationary fan laser transmitter; (B) detecting the single sloping fan beam generated by the stationary fan laser transmitter by using the mobile laser detector; and (C) timing the fan laser beam strike at the rover's location and using the timing of the fan laser beam strike at the rover's location to improve an accuracy in determination of position coordinates of the rover.

3 Claims, 3 Drawing Sheets

Transmitter - Detector Geometry

Planar Errors Affecting Fan Beam

METHOD FOR AUGMENTING RADIO POSITIONING SYSTEM USING SINGLE FAN LASER

BACKGROUND OF THE INVENTION

1. Field of the Invention

The present invention is in the field of position tracking and machine control systems, and, more specifically, is directed to augmenting a radio positioning system using a single fan laser system.

2. Discussion of the Prior Art

The combination of a radio-based positioning system, that can provide the centimeter accuracy in the best case scenario (RTK GPS) and a laser-based positioning system, that can provide a millimeter vertical coordinate accuracy, is intended to improve the vertical accuracy of the combined radio-light based positioning systems up to millimeters.

However, the prior art system utilize a fan laser generating at least two laser beams to provide information to a radio-based positioning sensor.

SUMMARY OF THE INVENTION

The present invention discloses simplified scheme that makes use of the precise timing of the radio-based positioning component of the combined radio and light based positioning system. This allows one to use a precisely timed single fan beam (instead of dual inclined laser fan beams) to improve the vertical accuracy of the combined radio and light based positioning system.

One aspect of the present invention is directed to a method of augmenting a mobile radio positioning system (Mobile_RADPS) by using a stationary fan laser transmitter.

In one embodiment, the method of the present invention comprises the following steps: (A) generating a single sloping fan beam by the stationary fan laser transmitter; (B) detecting the single sloping fan beam generated by the stationary fan laser transmitter by using the mobile laser detector; and (C) timing the fan laser beam strike at the rover's location and using the timing of the fan laser beam strike at the rover's location to improve an accuracy in determination of position coordinates of the rover. In this embodiment of the present invention, a rover comprises the mobile radio positioning system (Mobile_RADPS) integrated with a mobile laser detector. In this embodiment of the present invention, the stationary fan laser transmitter is integrated with a stationary radio positioning system (Stationary_RADPS).

In one embodiment of the present invention, the step (A) of generating the single sloping fan beam by the stationary fan laser transmitter further comprises the following steps: (A1) providing the stationary fan laser transmitter positioned in a location with known coordinates; and (A2) rotating the fan laser transmitter about its vertical axis at a substantially constant angular rate.

In one embodiment of the present invention, the step (A1) of providing the stationary fan laser transmitter positioned in the location with known coordinates further comprises the step (A1, 1) of self-surveying the stationary fan laser transmitter to determine its position coordinates by using the stationary radio positioning system (Stationary_RADPS).

In one embodiment of the present invention, the step of (A1, 1) further comprises the step (A1, 1, 1) of receiving a first plurality of external radio signals broadcasted by at least one radio source selected from the group consisting of: {GPS; GLONASS; combined GPS/GLONASS; GALILEO; Global Navigational Satellite System (GNSS) positioning system; and a pseudolite transmitter} by using the stationary radio positioning system (Stationary_RADPS). In this embodiment of the present invention, the stationary radio positioning system (Stationary_RADPS) is configured to utilize the first plurality of external radio signals to obtain position coordinates of the stationary fan laser transmitter.

In one embodiment of the present invention, the step (A1, 1) further comprises the following steps: (A1, 1, 2) providing a differential stationary radio positioning system (Stationary_RADPS); (A1, 1, 3) receiving a first plurality of external radio signals broadcasted by at least one radio source selected from the group consisting of: {GPS; GLONASS; combined GPS/GLONASS; GALILEO; Global Navigational Satellite System (GNSS); and a pseudolite transmitter} by using the differential stationary radio positioning system (Stationary_RADPS); and (A1, 1, 4) receiving a first set of differential corrections data broadcasted by at least one source selected from the group consisting of: {a Base Station, an RTK Base Station; a Virtual Base Station (VBS); and a pseudolite transmitter by using the differential stationary radio positioning system (Stationary_RADPS). In this embodiment of the present invention, the differential stationary radio positioning system (Stationary_RADPS) is configured to utilize the first plurality of external radio signals and the first set of differential corrections data to obtain position coordinates of the stationary fan laser transmitter.

In one embodiment of the present invention, the step of (A1, 1) further comprises the step (A1, 1, 5) of providing a wireless communication link configured to connect the differential stationary radio positioning system (Stationary_RADPS) to the source of differential correction data. In this embodiment of the present invention, wherein the wireless communication link is selected from the group consisting of: {a cellular link; a radio; a private radio band; a SiteNet 900 private radio network; a wireless Internet; a satellite wireless communication link; and an optical wireless link}.

In one embodiment of the present invention, the step (A2) of rotating the fan laser transmitter about its vertical axis further comprises the step (A2, 1) of mechanically rotating the fan laser transmitter head about its vertical axis at the substantially constant angular rate. In this embodiment of the present invention, the substantially constant angular rate of the rotation of the fan laser transmitter head about its vertical axis can be controlled by using a phase oscillator. In this embodiment of the present invention, the substantially constant angular rate of the rotation of the fan laser transmitter head about its vertical axis can be enhanced by giving the laser transmitter head a substantially sufficient mass.

In one embodiment of the present invention, the step (A2) of rotating the fan laser transmitter about its vertical axis further comprises the step (A2, 2) of optically rotating the fan laser transmitter about its vertical axis at the substantially constant angular rate.

In one embodiment of the present invention, the step (A) of generating the single sloping fan beam by the stationary fan laser further comprises the following steps: (A3) generating an electronic timing pulse every time a known position of the laser beam passes a reference mark in the laser transmitter; (A4) time-tagging each electronic timing pulse by using the stationary radio positioning system (Stationary_RADPS); (A5) generating an estimate of an angular rate of the laser beam by using a plurality of time tags, wherein each time tag is indicative of a time instant when the reference mark is crossed by an electronic timing pulse; and (A6) transmitting the estimate of the angular rate of the laser beam and the plurality of time tags to the rover via a wireless communication link.

In one embodiment of the present invention, the wireless communication link comprises a first wireless communication link. In another embodiment of the present invention, the wireless communication link comprises a second wireless communication link.

In one embodiment of the present invention, the step (A5) of generating an estimate of an angular rate of the laser beam by using a plurality of time tags, wherein each time tag is indicative of a time instant when the reference mark is crossed by an electronic timing pulse further comprises the step (A5, 1) of generating a low-pass filtered estimate of an angular rate of the laser beam by using a plurality of time tags, wherein each time tag is indicative of a time instant when the reference mark is crossed by an electronic timing pulse.

In one embodiment of the present invention, the step (A) of generating the single sloping fan beam by the stationary fan laser further comprises the following steps: (A7) including at least one additional reference mark in addition to a main reference mark; (A8) generating an electronic timing pulse every time a known position of the laser beam passes the main reference mark and each additional reference mark in the laser transmitter; (A9) time-tagging each electronic timing pulse by using the stationary radio positioning system (Stationary_RADPS); (A10) generating an estimate of an angular rate of the laser beam by using a plurality of time tags, wherein each time tag is indicative of a time instant when the main reference mark is crossed by an electronic timing pulse, or when each additional reference mark is crossed by an electronic timing pulse; and (A11) transmitting the estimate of the angular rate of the laser beam and the plurality of time tags to the rover via the wireless communication link; wherein a plurality of time tags defined by time-tagging the laser beam to each additional reference mark comprises a laser correction data that is configured to compensate for variation of the rotation angular speed of the laser beam.

In one embodiment of the present invention, the step (A10) of generating the estimate of the angular rate of the laser beam by using a plurality of time tags further comprises the step (A10, 1) of generating a low-passed filtered estimate of the angular rate of the laser beam by using a plurality of time tags, wherein each time tag is indicative of a time instant when the main reference mark is crossed by an electronic timing pulse, or when each additional reference mark is crossed by an electronic timing pulse.

In one embodiment of the present invention, the step (B) of detecting the single sloping fan beam generated by the stationary fan laser transmitter by using the mobile laser detector further comprises the following steps: (B1) detecting at least one light pulse generated by the laser transmitter by using a mobile laser detector; and (B2) receiving the estimate of the angular rate of the laser beam and the plurality of time tags by the rover. In this embodiment of the present invention, each light pulse corresponds to a single sloping fan laser beam strike at the rover's location. In this embodiment of the present invention, the leading and/or trailing edges of each light pulse are time-tagged by the stationary radio positioning system (Stationary_RADPS).

In one embodiment of the present invention, the step (B2) of receiving the estimate of the angular rate of the laser beam and the plurality of time tags by the rover further comprises the step of (B2, 1) of receiving the low-passed filtered estimate of the angular rate of the laser beam and the plurality of time tags by the rover.

In one embodiment of the present invention, the step (B2, 1) further comprises the step (B2, 1, 1) of using the wireless communication link to receive the low-passed filtered estimate of the angular rate of the laser beam and the plurality of time tags by the rover.

In one embodiment of the present invention, the step (B) of detecting the single sloping fan beam generated by the stationary fan laser transmitter by using the mobile laser detector further comprises the following steps: (B3) detecting at least one light pulse generated by the laser transmitter by using the mobile laser detector; wherein each light pulse corresponds to a single sloping fan laser beam strike at the rover's location; (B4) receiving the estimate of the angular rate of the laser beam and the plurality of time tags by the rover; wherein the leading and/or trailing edges of each light pulse are time-tagged by the stationary radio positioning system (Stationary_RADPS); and (B5) receiving the laser correction data configured to compensate for variation of the rotation angular speed of the laser beam; wherein the laser correction data comprises a plurality of time tags defined by time-tagging the laser beam to each additional reference mark.

In one embodiment of the present invention, the step (B4) further comprises the step (B4, 1) of receiving the low-passed filtered estimate of the angular rate of the laser beam and the plurality of time tags by the rover; wherein the leading and/or trailing edges of each light pulse are time-tagged by the stationary radio positioning system (Stationary_RADPS). In this embodiment of the present invention, the wireless communication link is used by the rover to receive the low-passed filtered estimate of the angular rate of the laser beam, to receive the plurality of time tags, and to receive the laser correction data.

In one embodiment of the present invention, the step (C) of timing the fan laser beam strike at the rover's location and using the timing of the fan laser beam strike at the rover's location to improve the accuracy in determination of position coordinates of the rover further comprises the following steps: (C1) measuring the time difference between the time instance when the light pulse corresponding to the single sloping fan laser beam strike at the rover's location is received and the latest main reference crossing time corresponding to the time instance when the center of the laser beam passes the main reference mark at the location of the laser transmitter; and (C2) calculating a height of the rover with improved accuracy based on position coordinates of the rover and based on the time difference measured at the step (C1); wherein the position coordinates of the rover are interpolated position coordinates interpolated between position coordinates taken at GPS time Epoch immediately preceding the laser strike and position coordinates taken at GPS time Epoch immediately after the laser strike.

In one embodiment of the present invention, the step (C2) further comprises the following steps: (C2, 1) providing a differential mobile radio positioning system (Mobile_RADPS); (C2, 2) receiving a second plurality of external radio signals broadcasted by at least one radio source selected from the group consisting of: {GPS; GLONASS; combined GPS/GLONASS; GALILEO; Global Navigational Satellite System (GNSS); and a pseudolite transmitter} by using the differential mobile radio positioning system (Mobile_RADPS); and (C2, 3) receiving a second set of differential corrections data broadcasted by at least one source selected from the group consisting of: {a Base Station, an RTK Base Station; a Virtual Base Station (VBS)

and a pseudolite transmitter} by using the differential mobile radio positioning system (Mobile_RADPS).

In one embodiment of the present invention, the step (C2) further comprises the step (C3) of optimizing the improved height calculation of the rover.

In one embodiment of the present invention, the step (C3) of optimizing the improved height calculation of the rover further comprises the step (C3, 1) of calculating a set of sensitivity parameters selected from the group consisting of: {a partial derivative of the rover's height with respect to a laser beam rotation frequency; a partial derivative of the rover's height with respect to a horizontal distance from the rover to the laser transmitter; a partial derivative of the rover's height with respect to a time difference between the actual laser strike time and the expected laser strike time; and a partial derivative of the rover's height with respect to a vertical angle}.

In one embodiment of the present invention, the step (C3) further comprises the step (C3, 2) of calculating the variable laser beam rotation frequency by using the plurality of time tags corresponding to time-tagging of the laser beam to each additional reference mark at the laser transmitter location.

In one embodiment of the present invention, the step (C) of timing the fan laser beam strike at the rover's location and using the timing of the fan laser beam strike at the rover's location to improve the accuracy in determination of position coordinates of the rover further comprises the step (C4) of calibrating the improved height calculation of the rover for planar errors affecting the planarity of the fan beam.

In one embodiment of the present invention, the method of augmenting the mobile radio positioning system (Mobile_RADPS) by using the stationary fan laser transmitter further comprises the step (D) of determining with improved accuracy position coordinates of an implement, wherein the implement is selected from the group consisting of: {a blade or a bucket on an earthmoving machine; an agricultural implement; and a device connected to a machine, wherein the device's location is being controlled}.

In one embodiment of the present invention, the step (D) further comprises the step (D1) of controlling the movement of the implement.

Another aspect of the present invention is directed to a radio and light based mobile positioning system comprising: (A) a means for generating a single sloping fan beam; (B) a means for detecting the single sloping fan beam at a rover's location, wherein the rover includes the mobile positioning system; (C) a means for timing the fan laser beam strike at the rover's location; and (D) a means for using the timing of the fan laser beam strike at the rover's location to improve an accuracy in determination of position coordinates of the rover.

In one embodiment, the system of the present invention further comprises a rover including an implement. In this embodiment, the system of the present invention further comprises a means (E) for using the timing of the fan laser beam strike at the rover's location to improve an accuracy in determination of position coordinates of the implement.

In one embodiment of the present invention, the means (E) further comprises a means (E1) for controlling the movement of the implement.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be comprised within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention discloses a simplified scheme that makes use of the precise timing of the radio-based positioning component of the combined radio and light based positioning system. This allows one to use a precisely timed single fan beam (instead of dual inclined laser fan beams) to improve the vertical accuracy of the combined radio and light based positioning system.

Figure 1:
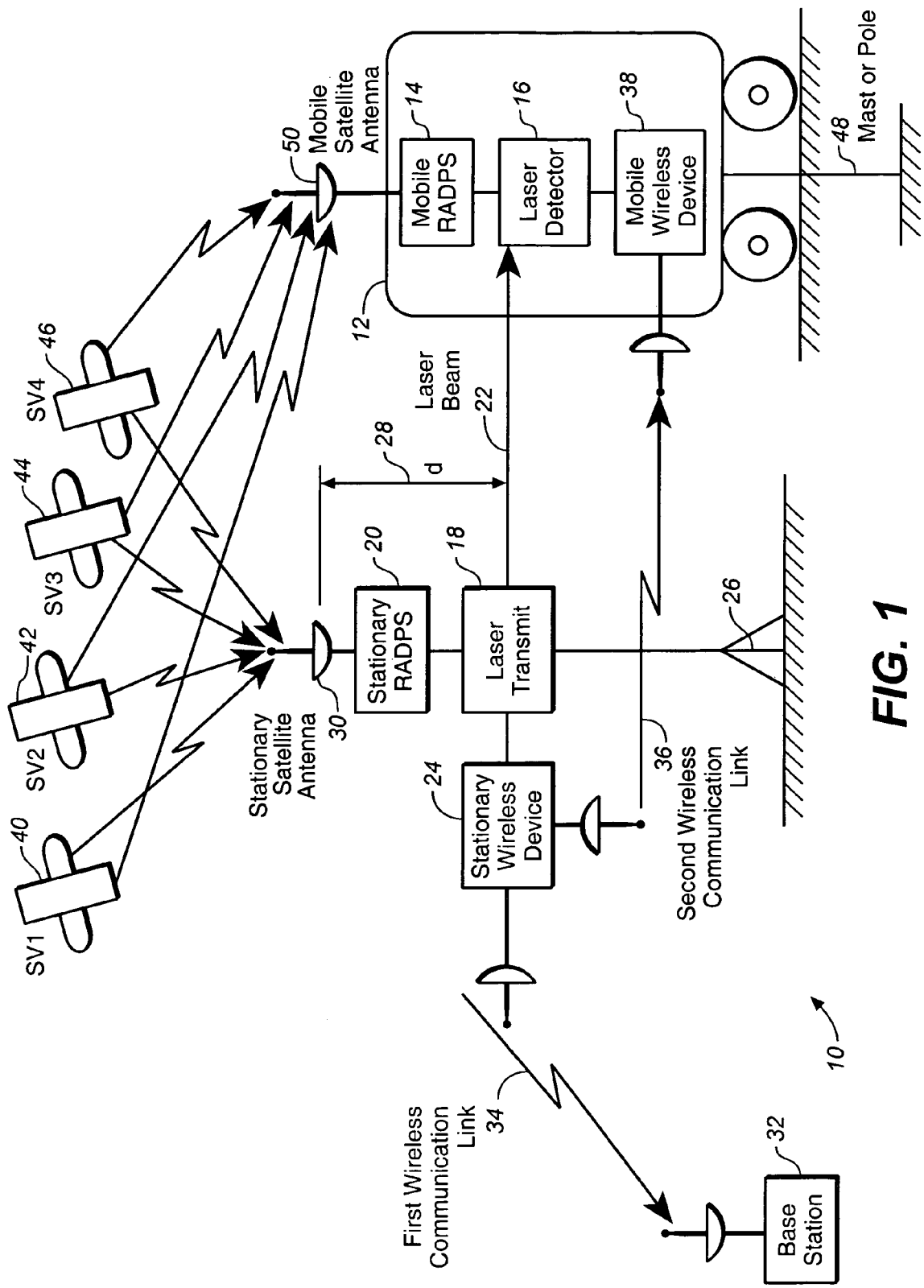
FIG. 1 depicts a radio and light based mobile positioning system of the present invention comprising a stationary fan laser transmitter integrated with a stationary radio positioning system (Stationary_RADPS), and a rover further comprising a mobile radio positioning system (Mobile_RADPS) integrated with a mobile laser detector.

FIG. 1 depicts a radio and light based mobile positioning system 10 of the present invention comprising: a rover 12 further comprising the mobile radio positioning system (Mobile_RADPS) 14 integrated with a mobile laser detector 16 and the stationary fan laser transmitter 18 integrated with the stationary radio positioning system (Stationary_RADPS) 20. In one embodiment of the present invention, the laser transmitter 18 is configured to generate a single-rotating laser beam 22.

The stationary radio positioning system (Stationary_RADPS) receiver 20 integrated with the laser transmitter 18 provides a number of benefits to a potential user comparatively with a system that mechanically combines a laser system and a RADPS receiver system. Indeed, the stationary radio positioning system (Stationary_RADPS) receiver 20 integrated with the laser transmitter 18 has the reduced cost as opposed to the cost of the combined laser and Stationary_RADPS system because the integrated system requires only one set of packaging, can utilize a shared computer memory and can use a common power supply. In the integrated system the laser beam and the electrical phase center of the Stationary_RADPS stationary antenna are separated by the known and fixed distance 'd' 28, wherein in the mechanically combined system the distance between the laser beam and the electrical phase center of the Stationary_RADPS stationary antenna is prone to errors because this distance is introduced by an operator of the integrated system.

In one embodiment of the present invention, the stationary radio positioning system (Stationary_RADPS) 20 is located in a position with known coordinates. In this embodiment, the coordinates of the laser transmitter 18 are known in advance.

In one embodiment of the present invention, the stationary radio positioning system (Stationary_RADPS) 20 is configured to perform the self-surveying in order to obtain its position coordinates 26 and also the coordinates of the laser transmitter 18 because the distance 'd' 28 between the stationary satellite antenna 30 and the laser transmitter is fixed and known.

According to the U.S. Pat. No. 6,433,866 "high precision GPS/RTK and laser machine control" assigned to the assignee of the present invention, the laser transmitter 18 further comprises a plane laser transmitter configured to generate a reference laser beam 22 providing a high accuracy vertical coordinate. The U.S. Pat. No. 6,433,866 is incorporated herein in its entirety.

More specifically, according to the '866 patent, the laser transmitter 18 includes a rotating laser system. In a rotating laser system a laser source spins (mechanically, or optically) in the horizontal plane (or Z-plane). The rotating laser emits a laser beam that provides an accurate reference plane with a millimeter accuracy. To detect and get benefit of the rotating laser beam, the potential user has to be located within vertical range, and has to be equipped with a laser detector (or a laser receiver) 16 capable of receiving the rotating laser beam. Please, see discussion below.

In the mechanical embodiment, the motor physically rotates the laser 18 and accordingly the laser beam 22. In the optical embodiment, the mirror prism rotates in such a way that the physically non-rotating laser emits the rotating laser beam.

In one embodiment of the present invention, a 3-D laser station generates at least one rotating fan-shaped laser beam 22. The 3D Laser Station that generates at least one rotating fan-shaped laser beam is disclosed in U.S. Pat. Nos. 6,870,608 and 6,643,004. Both U.S. Pat. Nos. 6,870,608 and 6,643,004 are incorporated herein in their entirety.

Referring still to FIG. 1, the stationary radio positioning system (Stationary_RADPS) receiver 20 can be selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540$ $f0$ and $f2=1,200$ $f0$ of a base frequency $f0=1.023$ MHz. The L1 signal from each satellite is binary phase shift key (BPSK) modulated by two pseudorandom noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, \ldots 24)$ is the channel or satellite number. These frequencies lie in two bands at 1.597-1.617 GHz (L1) and 1,240-1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

GALILEO will offer several service levels, from open access to restricted access of various levels:

(A) An open, free basic service, mainly involving applications for the general public and services of general interest. This service is comparable to that provided by civil GPS, which is free of cost for these applications, but with improved quality and reliability.

(B) A commercial service facilitating the development of professional applications and offering enhanced performance compared with the basic service, particularly in terms of service guarantee.

(C) A "vital" service (Safety of Life Service) of a very high quality and integrity for safety-critical applications, such as aviation and shipping. A search and rescue service that will greatly improve existing relief and rescue services.

(D) A public regulated service (PRS), encrypted and resistant to jamming and interference, reserved principally for the public authorities responsible for civil protection, national security and law enforcement which demand a high level of continuity. It will enable secured applications to be developed in the European Union, and could prove in particular to be an important tool in improving the instruments used by the European Union to combat illegal exports, illegal immigration and terrorism.

Reference to a Radio Positioning System (RADPS) herein refers to a Global Positioning System, to a Global Orbiting Navigation System, to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

Referring still to FIG. 1, in one embodiment of the present invention, the Stationary_RADPS receiver 20 utilizes four satellite vehicles SV1 40, SV2 42, SV3 44, SV4 46 to determine its position coordinates.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability.

The complete description of the pseudolite transmitters in GPS band can be found in 'Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in ISM band.

In one embodiment of the present invention, a pseudolite can be implemented by using a ground based transmitter that transmits in the GPS band such as the Terralite system designed by Novariant. The Novariant's Terralite XPS system provides mine managers with direct control of the reliability of their positioning systems and helps cover gaps in GPS coverage. The Terralite XPS system is comprised of a network of transmitting stations (Terralites) and mobile receivers. The Terralites broadcast the XPS positioning signal throughout mines to 12-channel, tri-frequency mobile receivers (L1, L2, XPS). The 241×173×61-millimeter Terralite receivers weigh 4.5 pounds and utilize 9 to 32 volts DC at 22 watts. In XPS mode reported position accuracy is 10 centimeters horizontal and 15 centimeters vertical. Novarinat is located at Menlo Park, Calif., United States.

The following discussion is focused on a GPS receiver, though the same approach can be used for a GLONASS receiver, for a GPS/GLONASS combined receiver, GALILEO receiver, or any other RADPS receiver.

Referring still to FIG. 1, in one embodiment of the present invention, the Stationary_RADPS receiver 20 comprises a differential GPS receiver. In differential position determination, many of the errors in the RADPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

Referring still to FIG. 1, in one embodiment of the present invention, the Stationary_RADPS (differential GPS) receiver 20 can obtain the differential corrections from the Base Station 32.

The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in another embodiment of the present invention, the differential GPS receiver 14 can be implemented by using a TRIMBLE Ag GPS-132 receiver that obtains the differential corrections from the U.S. Cost Guard service free in 300 kHz band broadcast by using the wireless communication device 24 and the first wireless communication link 34. In this embodiment, the self-surveying laser transmitter 18 integrated with the differential GPS receiver 20 should be placed within (2-300) miles from the U.S. Cost Guard Base Station. The accuracy of this differential GPS method is about 50 cm.

Referring still to FIG. 1, in one embodiment of the present invention, the differential corrections can be obtained from the Wide Area Augmentation System (WAAS) by using the wireless communication device 24 and the first wireless communication link 34.

The WAAS system includes a network of Base Stations that uses satellites (initially geostationary satellites-GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

Referring still to FIG. 1, in one embodiment of the present invention, the real time kinematic (RTK) differential GPS receiver 20 can be used to obtain the position locations with less than 2 cm accuracy. The RTK differential GPS receiver receives the differential corrections from the Base Station 32 placed in a known location within (10-50) km by using the wireless communication device 24 and the first wireless communication link 34. For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

Referring still to FIG. 1, in one embodiment of the present invention, the differential corrections can be obtained by the Stationary_RADPS receiver 20 from the Virtual Base Station (VBS) 32 by using the wireless communication device 24 and the first wireless communication link 34.

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. These corrections can be delivered to the self-surveying laser transmitter 18 by using the first wireless communication link 34 and wireless communication device 24.

An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

Referring still to FIG. 1, in one embodiment of the present invention, the first wireless communication link 34 can be implemented by using a variety of different embodiments.

In general, the first wireless communication link 34 (of FIG. 1) can be implemented by using a radiowave frequency band, an infrared frequency band, or a microwave frequency band. In one embodiment, the wireless communication link can include the ISM band, including 900 MHZ, 2.4 GHz, or 5.8 GHz bands, wherein the user can own both ends of the ISM communication system.

In one embodiment of the present invention, the first wireless communication link 34 (of FIG. 1) can be implemented by using the Trimble SiteNet™ 900 private radio network. The Trimble SiteNet™ 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902-928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision™ GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the first wireless communication link 34 (of FIG. 1) can be implemented by using a 1.8 GHz band that supports the personal communications services (PCS). The PCS uses the international standard DCS-1800. Yet, in one more embodiment, the first wireless communication link 34 can include a real time circuit switched wireless communication link. For instance, the wireless communication link employing a real time circuit switched wireless communication link can include the Iridium satellite system produced by Motorola, Schaumburg, Ill.

In one additional embodiment, the first wireless communication link 34 can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20-30) GHz range are manufactured by Cellular Communications located in Redmond, Wash., and the LEOS systems in (1.6-2.5) GHz range are produced by Loral/Qualcomm located in San Diego, Calif.

The first wireless communication link 34 can include a cellular telephone communication means, a paging signal receiving means, wireless messaging services, wireless application services, a wireless WAN/LAN station, or an Earth-satellite-Earth communication module that uses at least one satellite to relay a radiowave signal. The first wireless communication link 34 can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

For the purposes of the present invention, a cellular telephone communication means can be used to get a wireless access to the Internet in order, for example, to broadcast the real time coordinates of the self-surveying laser transmitter 18 position on a special web-site.

Referring still to FIG. 1, the wireless communication device 24 can be implemented by using any of devices that can be configured to provide: {a cellular link; a radio link; a private radio band link; a SiteNet 900 private radio network link; a link to the wireless Internet; and a satellite wireless communication link}. A person skillful in the art can easily identify all these devices. Please, see the discussion above.

In one embodiment of the present invention, the wireless communication device 24 is configured to respond to specific requests from a mobile equipment (not shown) transmitted over the first wireless communication link 34.

Referring still to FIG. 1, in one embodiment of the present invention, the laser transmitter 18 comprises a fan laser transmitter configured to generate a single rotating fan-shaped laser beam 22 that rotates continuously about a vertical axis at a uniform rate above a known stationary point in the plot of land. The 3-D Laser Station that generates a single rotating fan-shaped laser beam was disclosed in U.S. Pat. Nos. 6,870,608 and 6,643,004.

Referring still to FIG. 1, in one embodiment, the apparatus of the present invention 10 further comprises a distance measuring device (not shown) integrated with the laser transmitter 18 and integrated with the Stationary_RADPS receiver 20. In this embodiment, the distance measuring device (not shown) is configured to measure the distance between the phase center of the stationary radio antenna 30 and a known point or reference plane (not shown) over which the self-surveying laser transmitter 18 is positioned in order to determine the position coordinates of the laser transmitter 18 in relation to the known point or the reference plane (not shown).

Trimble manufactures a new Spectra Precision Laser HD360, a handheld distance measurement tool that delivers speed, accuracy and safety to builders, engineers and other construction-related contractors. It is especially useful for measuring distances to hazardous and hard-to-reach locations. The HD360 is an easy-to-use, portable contractor's tool that includes a data display screen and a six-button keypad. Using laser technology, it is capable of measuring distance, area and volume, whether indoors or outdoors. The HD360's accuracy is ±3 mm or better, at ranges up to 60 meters. The HD360 can be used for building checks and inspections, positioning of building components, building maintenance, alignment and spacing of installation points, installation of drywalls and ceilings, layout from fixed reference points, and calculation of areas and volumes.

Trimble also manufacturers the HD150 that is ideal for use by general construction and interior contractors, builders, engineers, HVAC contractors and electrical contractors. Its accuracy and other productivity enhancing qualities make it the smart choice for a wide variety of applications. Even in hard-to-reach or hazardous locations, such as elevator shafts or open stairways, the HD150 is sufficient for all distance measurement applications.

Above-referenced Trimble devices can be used as wide range of Electronic Distance Measurement (EDM) tools to implement the distance measurement device. More specifically, a special laser "gun" beam can be used to measure very precisely the time it takes for a laser beam to make the round-trip from the "gun" to the reflectors, and back. Using this time, the known speed that the laser travels (the speed of light), and correcting for air temperature and pressure, the distance can be determined to a precision of 1 part per million (i.e. 1 mm over a distance of 1 km).

Referring still to FIG. 1, in one embodiment of the present invention, the rover 12 includes the laser detector 16 and the mobile radio positioning system (Mobile_RADPS) receiver 14. The Mobile_RADPS receiver 14 is selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

In one embodiment of the present invention, the Mobile_RADPS receiver 14 is configured to determine its position coordinates using at least four radio signals generated by four satellite vehicles SV1 40, SV2, 42, SV3 44, and SV4 46.

In one embodiment of the present invention, the Mobile_RADPS receiver 14 comprises a differential Mobile_RADPS receiver 14. In this embodiment, the second wireless communication link 36 can used to substantially continuously transmit to the differential Mobile_RADPS receiver 14 the precise coordinate measurements of the laser transmitter 18 and the set of differential corrections obtained by the differential Stationary_RADPS receiver 20. In this embodiment, the differential Mobile_RADPS receiver 14 can utilize the differential corrections to obtain the precise coordinate measurements of the rover 12 and laser detector 14.

The second wireless communication link 36 can be implemented by using a cellular link; a radio link; a private radio band link; a SiteNet 900 private radio network link; a link to the wireless Internet; and a satellite wireless communication link.

Referring still to FIG. 1, the laser detector 16 comprises a number of photo-diodes. The laser detector 16 measures the signal strength on a number of photo-diodes to determine the center of a laser beam 22. Trimble manufactures machine mounted laser detectors LR 21 or CR 600 that can be used for the purposes of the present invention.

Referring still to FIG. 1, in one embodiment of the present invention, the laser transmitter 18 comprises a single fan-beam system. The beam is rotated about a vertical axis at a very constant angular rate 4 rad/s. The frequency of rotation is given by f (Hz), while the period of rotation is T seconds. The following relationship exists between the angular parameters:

$$\omega = \frac{2\pi}{T} = 2\pi \times f_{[rad/s]} \quad (1)$$

The laser transmitter 18 head (not shown) is rotated within good bearings and is driven by a motor which is phase oscillator locked. Furthermore, the laser transmitter head is given sufficient mass to enhance the constant rotation rate of the fan-beam. The present rotation rate is 40 to 50 Hz.

An electronic timing pulse is generated every time the center of the laser beam 22 passes a zero direction mark (not shown) in the laser transmitter 18. The timing pulse is accurately (typically to within 40 nanoseconds) time tagged within the position coordinates of the transmitter 18 (determined by the Stationary_RADPS 20) and is denoted $\tau$.

The rotating rate of the laser is typically 50-60 Hz. A low-passed filtered estimate of the spin rate can be readily generated from the zero-direction crossing times. This information is then transmitted to the rover unit 12 using the mobile wireless device 38 via the second wireless data link 36 that is preferably also used for the RADPS differential angular rate data.

It will be shown later that variations in the spin rate of the laser directly impact on the accuracy of height estimates of the rover 12. Apart from careful manufacture of the rotating laser head, it is possible to comprise additional timing marks at say every $\pi/4$ radians of rotation where RADPS time stamps are made. Differences between the observed and expected time-tags at the $\pi/4$; $\pi/2$; $3\pi/4$ reference points provide a laser correction mechanism for users of the laser signals.

The zero direction crossing times are sent to the rover 12 via the second wireless communication link 36. If necessary, additional rotation rate variation parameters can also be comprised.

In one embodiment of the present invention, the rover unit 12 is mounted on a mast 48 for machine control applications, or on a portable pole 48 for hand-held construction setup etc, or on the cab of a machine. As was disclosed above, the rover 12 includes an integrated laser detector 16 and Mobile_RADPS receiver 14 that tracks radio (or satellite signals). The laser detector 16 is capable of detecting the light pulse generated by the laser transmitter 18. The leading and/or trailing edge of the pulse are time-stamped using the Mobile_RADPS receiver 14 to accuracy better than 100, typically about 40 nanoseconds.

In one embodiment of the present invention, as was disclosed above, the Mobile_RADPS receiver 14 comprises a differential Mobile_RADPS receiver that receives differential corrections from any other source of the differential correction stream.

In one embodiment of the present invention, the differential Mobile_RADPS receiver is capable of computing its location relative to the laser transmitter 18 to within a few centimeters using real-time kinematic (RTK) techniques. However, the precision of the height component of the rover is appreciably worse with RADPS techniques compared with the laser positioning.

In one embodiment of the present invention, the height of the rover 12 is determined at the rover's location by using the laser detector 16 according to the following procedure.

Figure 2:
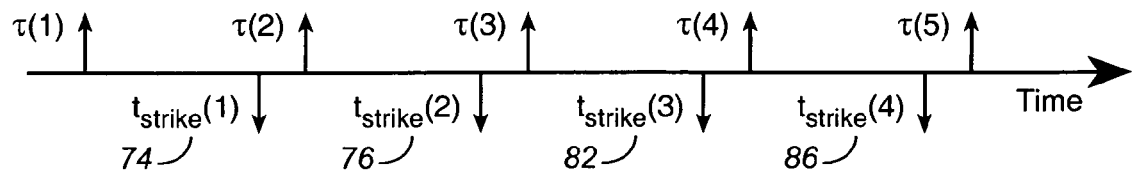
FIG. 2 is a timing diagram that illustrates how a low-passed filtered estimate of the laser transmitter rotation rate is first generated by using the time series of zero crossings for the purposes of the present invention.

At the first step, as shown in FIG. 2 in timing diagram 70, a low-passed filtered estimate of the laser transmitter 18 rotation rate is first generated using the time series of zero crossings:

$$\tau(1)72, \tau(2)76, \tau(3)80, \tau(4)84, \tau(5)88, \ldots \tau(n)$$

The timing diagram 70 also illustrates the timings of laser strikes $t_{strike}(1)$ 74, $t_{strike}(2)$ 76, $t_{strike}(3)$ 82, and $t_{strike}(4)$ 86 at the laser detector's location. Let $f_{filt}$ be the low-passed filtered rotation frequency, and $T_{filt}$ be the corresponding period of rotation.

At the next step, the laser detector 16 is configured to measure the time difference between the received laser pulse (strike) and the last zero crossing time:

$$t_{diff}(i) = t_{strike}(i) - \tau(i); \quad (2)$$

where:

$t_{diff}(i)$ is the difference between the laser strike time at epoch i and the corresponding zero crossing time;

$\tau(i)$ is the time of the zero crossing for epoch i;

$t_{strike}(i)$ is the time of the laser strike at epoch i.

In practice, laser strikes may be received prior to knowing the last zero crossing time. This delay is due mainly to the time taken to time-stamp the zero crossing times and broadcast and receive them. Eq. (2) can be modified according to:

$$t_{diff}(i) = t_{strike}(i) - [\tau(i-m) + T_{filt} \times m]; \quad (3)$$

where:

$\tau(i-m)$ is the zero cross time m-rotations ago, $T_{filt}$ is the low-passed filtered rotation period (in seconds), m is an integer number of rotations.

At the next step, the Mobile_RADPS receiver 14 determines the horizontal and vertical rover's location relative to the laser transmitter 18 to within a few centimeters. The azimuth of the rover unit is then derived from:

$$\alpha = \tan^{-1}\left(\frac{E_T - E_R}{N_T - N_R}\right). \quad (4)$$

In an actual system, one would allow an orientation of the laser transmitter to be arbitrary and the reference orientation can be determined from the measured laser azimuth angle and the GPS vector from the stationary to the mobile RADPS.

However, at the following step, assuming the laser transmitter 18 is aligned to true north, and that the laser 18 transmitter and rover 12 are at the same height, then the laser strike time will be given by:

$$t_\alpha(i) = \tau(i) + \alpha(i) \times \omega; \quad (5)$$

where:

$$t_\alpha(i)$$

is the expected laser strike time for the rover at azimuth α, and at the same height as the transmitter;

α(i) is the azimuth of the rover relative to the transmitter at epoch i;

ω is the angular rate of rotation of the transmitter head, as defined in Eq. (1).

At the next step, one assumes that, in general, the rover 12 will lie above or below the height of the laser transmitter 18. If this is the case, the actual laser strike time will differ from that obtained in Eq. (5). It is this time difference, $t_{obs}$, which enables one to precisely compute the height of the rover 12, where:

$$t_{obs}(i) = t_{strike}(i) - t_\alpha(i). \quad (6)$$

Figure 3:
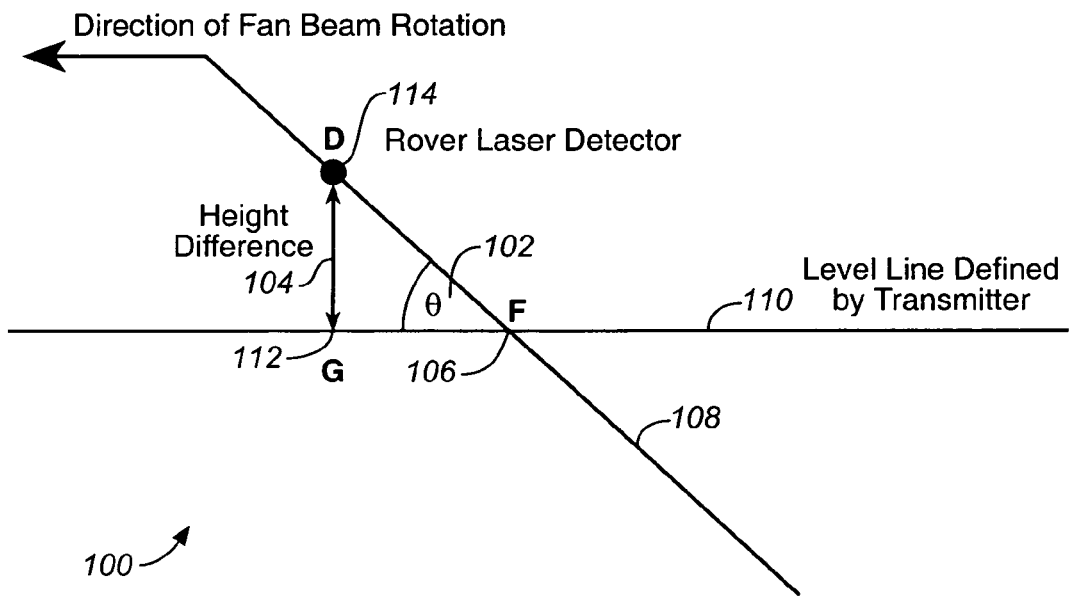
FIG. 3 illustrates the geometry of the laser beam and observed height difference for the purposes of the present invention.

FIG. 3 is a diagram 100 that illustrates the geometry of the laser beam and observed the height difference 104 for the purposes of the present invention. More specifically, the diagram 100 illustrates the view looking back towards the laser transmitter 18 (of FIG. 1) from outside the rover 12 (of FIG. 1). The fan beam 108 is inclined at an angle, θ radians, 102, as shown. Let point F 106, be the intersection of the fan-beam 108, a horizontal plane at the height of the transmitter 110, and the vertical plane containing the laser detector (D) 114. Point G 112, is vertically beneath D 114 and in the same plane as F 106. The observed time difference $t_{obs}$, described in Eq. (6) can be converted to an equivalent angle subtended at the laser transmitter via:

$$\phi(i) = \omega \times t_{obs}(i). \quad (7)$$

Figure 4:
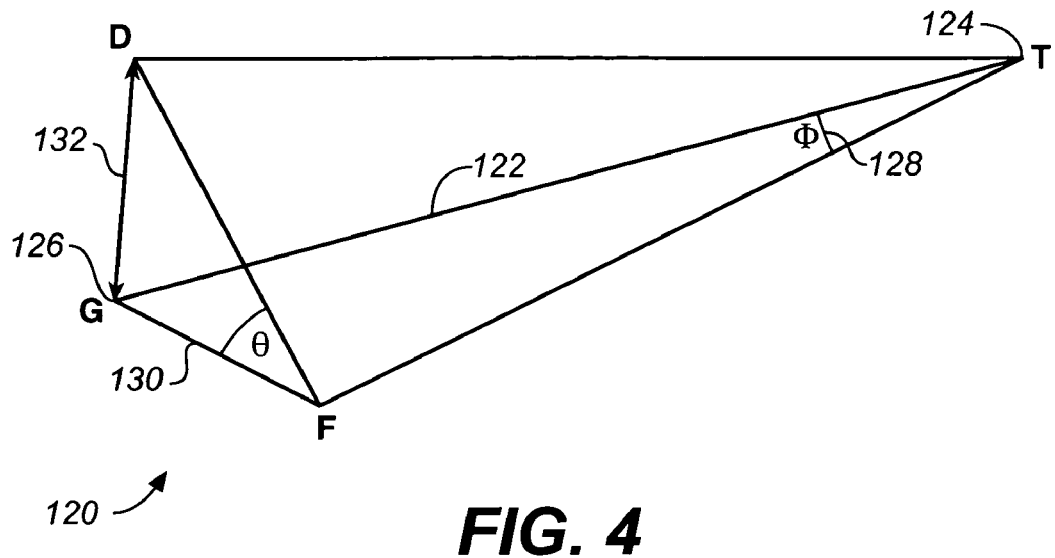
FIG. 4 is an illustration of the laser transmitter-laser detector geometry for the purposes of the present invention.

FIG. 4 illustrates the transmitter-detector geometry 120 for the purposes of the present invention. The horizontal distance (TG) 122 from the transmitter (T) 124 to detector (G) 126 is indirectly observed using the Mobile_RADPS 14 (of FIG. 1) to within a few centimeters.

At the next step, with TG 122 known, and the angle FTG . 128 observed Eq. (7), the horizontal distance FG 130 can be obtained as follows:

$$FG = 2TG \times \sin\left(\frac{\phi}{2}\right). \quad (8)$$

The laser determined height difference DG 132 is computed with:

$$DG = FG \times \tan(\theta). \quad (9)$$

At the next step, by combining the results from Eq. (7) and Eq. (8) into Eq. (9), a general expression for the laser height can be generated:

$$DG = 2TG \times \sin\left(\frac{\omega t_{obs}}{2}\right) \times \tan(\theta). \quad (10)$$

The position coordinates of the rover are interpolated position coordinates interpolated between position coordinates taken at GPS time Epoch immediately preceding the laser strike and position coordinates taken at GPS time Epoch immediately after the laser strike.

The described above height determination process is affected by a number of parameters as shown in Eq. (11) below. It is useful to analyze the impact of the uncertainty in each parameter on the height difference. With this knowledge, it is possible to optimize the system design.

In general, $$DG = f(TG, \omega, t_{obs}, \theta). \quad (11)$$

The total derivative of Eq. (11) is given by:

$$\Delta DG = \frac{df}{dTG}\Delta TG + \frac{df}{d\omega}\Delta\omega + \frac{df}{dt_{obs}}\Delta t_{obs} + \frac{df}{d\theta}\Delta\theta \quad (12)$$

with the following partial derivatives:

$$\frac{df}{dTG} = 2 \times \sin\left(\frac{\omega t_{obs}}{2}\right) \times \tan(\theta) \quad (13)$$

$$\frac{df}{d\omega} = TG \times \cos\left(\frac{\omega t_{obs}}{2}\right) \times \tan(\theta) \times t_{obs} \quad (14)$$

$$\frac{df}{dt_{obs}} = TG \times \cos\left(\frac{\omega t_{obs}}{2}\right) \times \tan(\theta) \times \omega \quad (15)$$

$$\frac{df}{d\theta} = 2TG \times \sin\left(\frac{\omega t_{obs}}{2}\right) \times \sec^2(\theta) \quad (16)$$

The table below considers how an error in each parameter contributes to the total error in the computed height difference DG. The second row provides some example parameters for a rover operating 5 meters from the transmitter and 1.339 m above (or below it). The rotation frequency of the laser is taken to be 50 Hz and the beam is inclined at 45 degrees. The partial derivatives of each parameter are shown in row 4.

TABLE 1

Sensitivity parameters for short range operation.

| TG [m] | ω [rad/s] | $t_{obs}$ [s] | θ [rad] |
|---|---|---|---|
| 5.0 | 314.16 | 0.000855 | 0.7854 |
| df/dTG | df/dω | df/d$t_{obs}$ | df/dθ |
| 0.2678 | 0.0042 | 1556.7 | 2.6780 |

The RADPS position can readily be obtained to within a few centimeters horizontally, hence TG=0.02 m. The spin rate of the laser transmitter is well controlled and therefore should have an error of less than 0.5% (Δω=1.5708 rad). With the aid of RADPS, the laser strike should have a timing error of 40 nanoseconds ($\Delta t_{obs}$=4.0e-8s)

The beam angle tilt should be known to <0.01 degrees ($\Delta\theta$=1.745e-4 rad). Using Eq. (12) and the assumed error sources and sensitivities from Table 1, the total error in height will be:

$$DG=0.0054+0.0066+0.0001+0.0005=0.014 \text{ m}.$$

Having a constant spin rate is very important for system performance. An error in the spin rate of only 0.5% will lead to 4.2 mm of height error at a range of 5 m.

Now consider a rover 100 m away from the transmitter, at a height difference of 15 m.

TABLE 2

| Sensitivity parameters for long range operation. | | | |
|---|---|---|---|
| TG [m] | $\omega$ [rad/s] | $t_{obs}$ [s] | $\theta$ [rad] |
| 100.0 | 314.16 | 0.000478 | 0.7854 |
| df/dTG | df/d$\omega$ | df/dt$_{obs}$ | df/d$\theta$ |
| 0.150 | 0.0477 | 31327.5 | 30.00 |

As the distance between the transmitter and rover increase, the system becomes more sensitive to errors in the various parameters, except the error in the positions between the base and rover because with a fixed error (say +/−0.01 m) the angular error decreases with increasing range.

Assuming the same level of error sources defined for the short range case, the total height error for the long range example will be:

$$DG=0.0030+0.0749+0.0012+0.0052=0.0843 \text{ m}$$

The dominant error source in the height error is due to the variation in the laser rotation rate. In order to obtain a height error of 2 mm, the rotation rate of the laser mast be known to 0.04 rad/s (=0.013%).

Some suggestions have already been provided for dealing with variations in the rotation rate of the rotating laser head using say 8 timing points in the rotation. Better still, many tens of calibration points could be sampled using the readout of the phase-locked rotation head. A polynomial could then be fitted to the rotation rate samples and sent to the user in a laser correction message.

Figure 5:
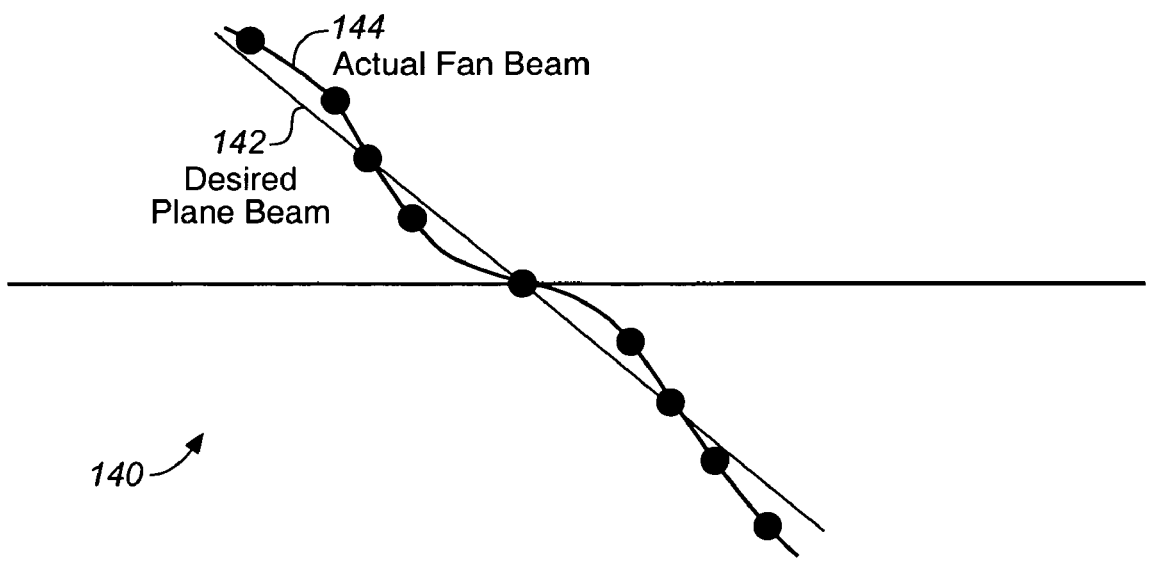
FIG. 5 depicts a diagram that illustrates fan beam planar errors due to slight manufacturing imperfections in optical components for the purposes of the present invention.

FIG. 5 depicts a diagram 140 that illustrates fan beam planar errors due to slight manufacturing imperfections in optical components for the purposes of the present invention.

The following technique for calibrating it out of the system is disclosed in the present invention. More specifically, with the instrument setup at a test fixture, a detector is incremented (as shown by the black dots 144 in FIG. 5) through the entire vertical range in the system. The height determined from the RADPS/laser system is compared with known calibration heights. The difference between the two heights provides a measure of the fan-beam planar errors, assuming of course that all other system errors have been appropriately accounted for.

In one embodiment of the present invention, the position coordinates of the implement can be determined with improved accuracy as was disclosed above. Therefore, the movement of the implement can be controlled, which could be important in certain applications. The implement is selected from the group consisting of: {a blade or a bucket on an earthmoving machine; an agricultural implement; and a device connected to a machine, wherein the device's location is being controlled}.

For instance, in order to detect the plane of light when the rover is moving over terrain of variable elevation, a laser receiver can be mounted on an electric mast that can move the laser receiver up or down to keep it in the beam. (For instance, the EM21 and LR21 combinations that are offered presently by Trimble Navigation Ltd.)

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of augmenting a mobile radio positioning system (Mobile RADPS) by using a stationary fan laser transmitter; wherein a rover comprises said mobile radio positioning system (Mobile RADPS) integrated with a mobile laser detector; and wherein said stationary fan laser transmitter is integrated with a stationary radio positioning system (Stationary RADPS); said method comprising:

(A1, 1) self-surveying said stationary fan laser transmitter to determine its position coordinates by using said stationary radio positioning system (Stationary RADPS);

(A2) rotating said fan laser transmitter about its vertical axis at a substantially constant angular rate;

(A3) generating an electronic timing pulse every time a known position of said laser beam passes a reference mark in said laser transmitter;

(A4) time-tagging each said electronic timing pulse by using said stationary radio positioning system (Stationary RADPS);

(A5, 1) generating a low-passed filtered estimate of said angular rate of said laser beam by using said plurality of time tags; wherein each said time tag is indicative of a time instant when said reference mark is crossed by one said electronic timing pulse;

(A6) transmitting said estimate of said angular rate of said laser beam and said plurality of time tags to said rover via a wireless communication link; wherein said wireless communication link is selected from the group consisting of: {a cellular link; a radio; a private radio band; a SiteNet 900 private radio network; a wireless Internet; a satellite wireless communication link; and an optical wireless link};

(B) detecting said single sloping fan beam generated by said stationary fan laser transmitter by using said mobile laser detector; and (C) timing said fan laser beam strike at said rover's location and using said timing of said fan laser beam strike at said rover's location to improve accuracy in determination of position coordinates of said rover.

2. A method of augmenting a mobile radio positioning system (Mobile RADPS) by using a stationary fan laser transmitter; wherein a rover comprises said mobile radio positioning system (Mobile RADPS) integrated with a mobile laser detector; and wherein said stationary fan laser transmitter is integrated with a stationary radio positioning system (Stationary RADPS); said method comprising:

(A1) providing said stationary fan laser transmitter positioned in a location with known coordinates;
(A2) rotating said fan laser transmitter about its vertical axis at a substantially constant angular rate;
(A7) including at least one additional reference mark in addition to a main reference mark;
(A8) generating an electronic timing pulse every time a known position of said laser beam passes said main reference mark and each said additional reference mark in said laser transmitter;
(A9) time-tagging each said electronic timing pulse by using said stationary radio positioning system (Stationary_RADPS);
(A10) generating an estimate of an angular rate of said laser beam by using a plurality of time tags, wherein each said time tag is indicative of a time instant when said main reference mark is crossed by one said electronic timing pulse, or when each said additional reference mark is crossed by one said electronic timing pulse;
(A11) transmitting said estimate of said angular rate of said laser beam and said plurality of time tags to said rover via said wireless communication link; wherein a plurality of time tags defined by time-tagging said laser beam to each said additional reference mark comprises a laser correction data that is configured to compensate for variation of said rotation angular speed of said laser beam;
(B) detecting said single sloping fan beam generated by said stationary fan laser transmitter by using said mobile laser detector; and
(C) timing said fan laser beam strike at said rover's location and usin said timing of said fan laser beam strike at said rover's location to improve accuracy in determination of position coordinates of said rover.

3. The method of claim 2, wherein said step (A10) of generating said estimate of said angular rate of said laser beam by using said plurality of time tags further comprises the step of:
(A10, 1) generating a low-passed filtered estimate of said angular rate of said laser beam by using said plurality of time tags; wherein each said time tag is indicative of a time instant when said main reference mark is crossed by one said electronic timing pulse, or when each said additional reference mark is crossed by one said electronic timing pulse.

* * * * *